June 23, 1942.  W. F. NEWHOUSE  2,287,121
MACHINERY FOR MAKING CONTAINERS
Original Filed Feb. 4, 1937   12 Sheets-Sheet 1

Fig.1

Inventor:
Walter F. Newhouse
By Arthur F. Durand
Atty.

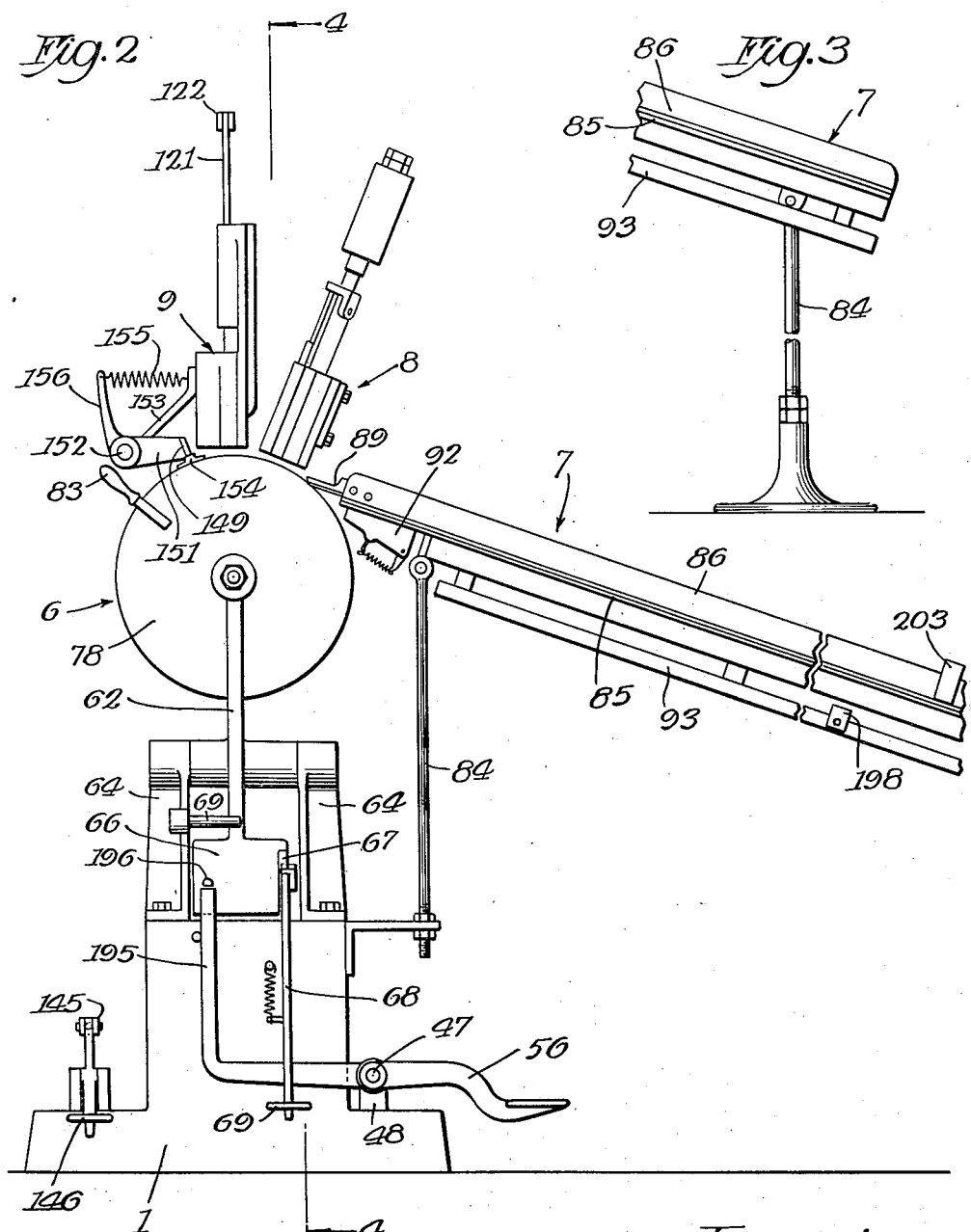

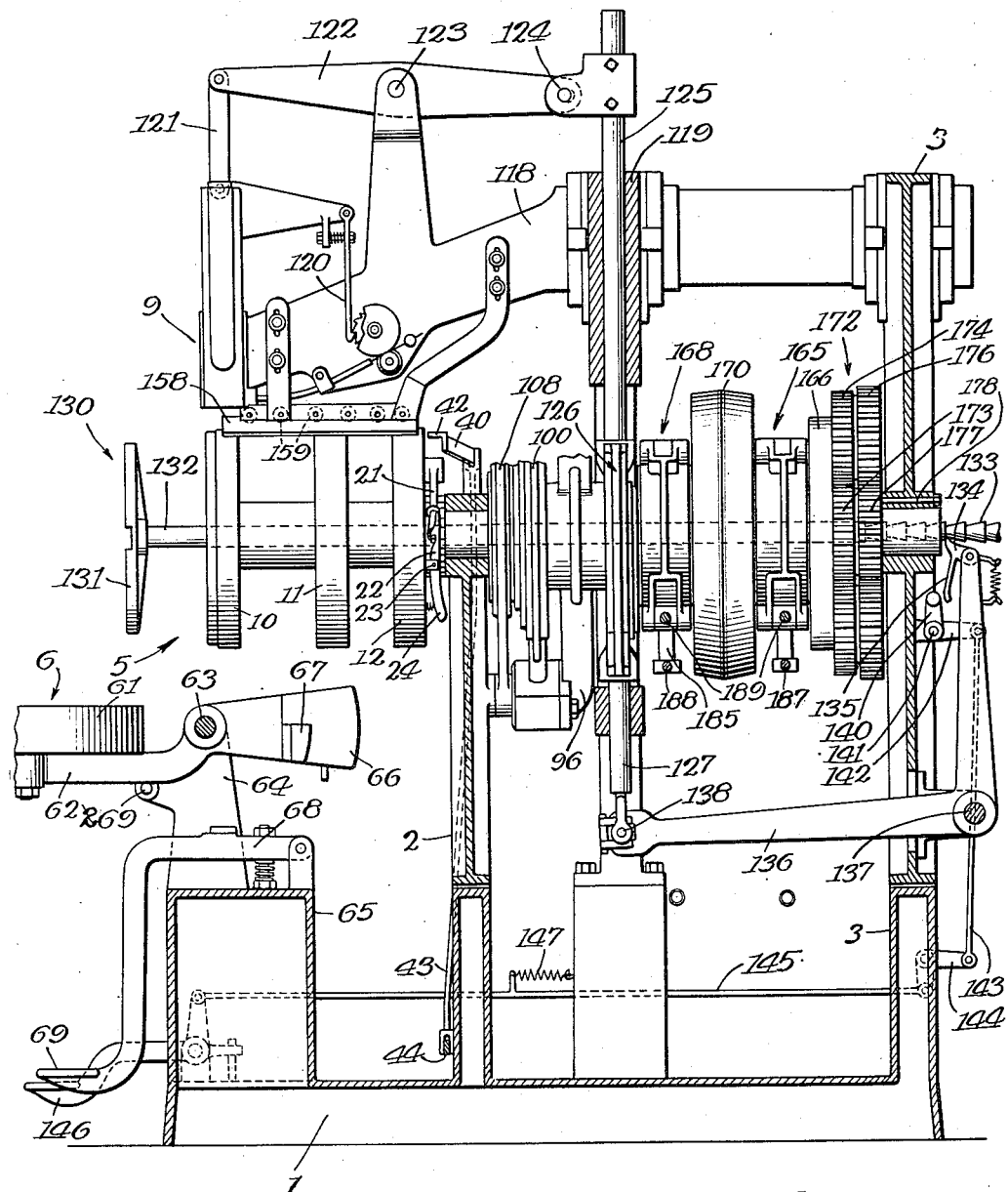

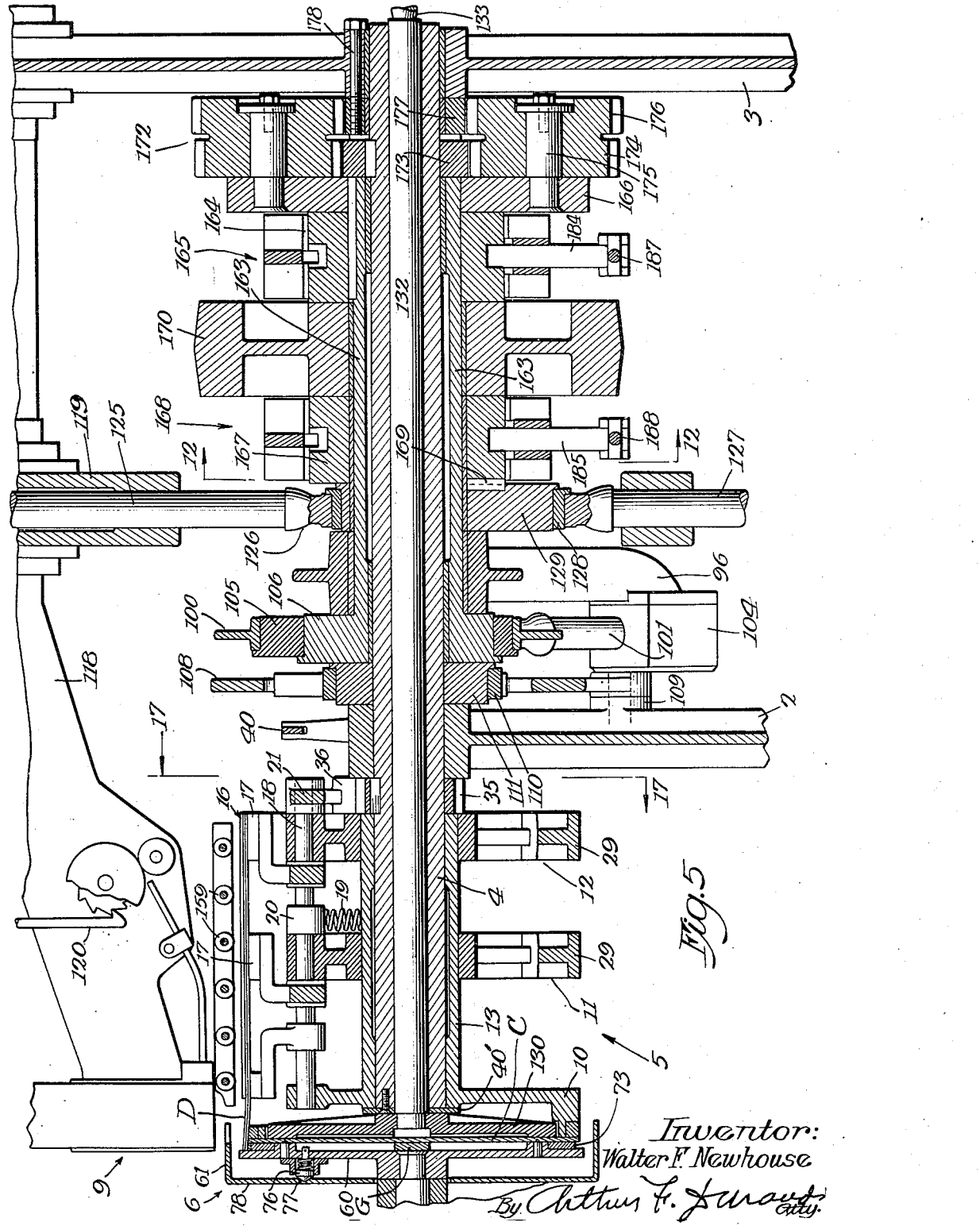

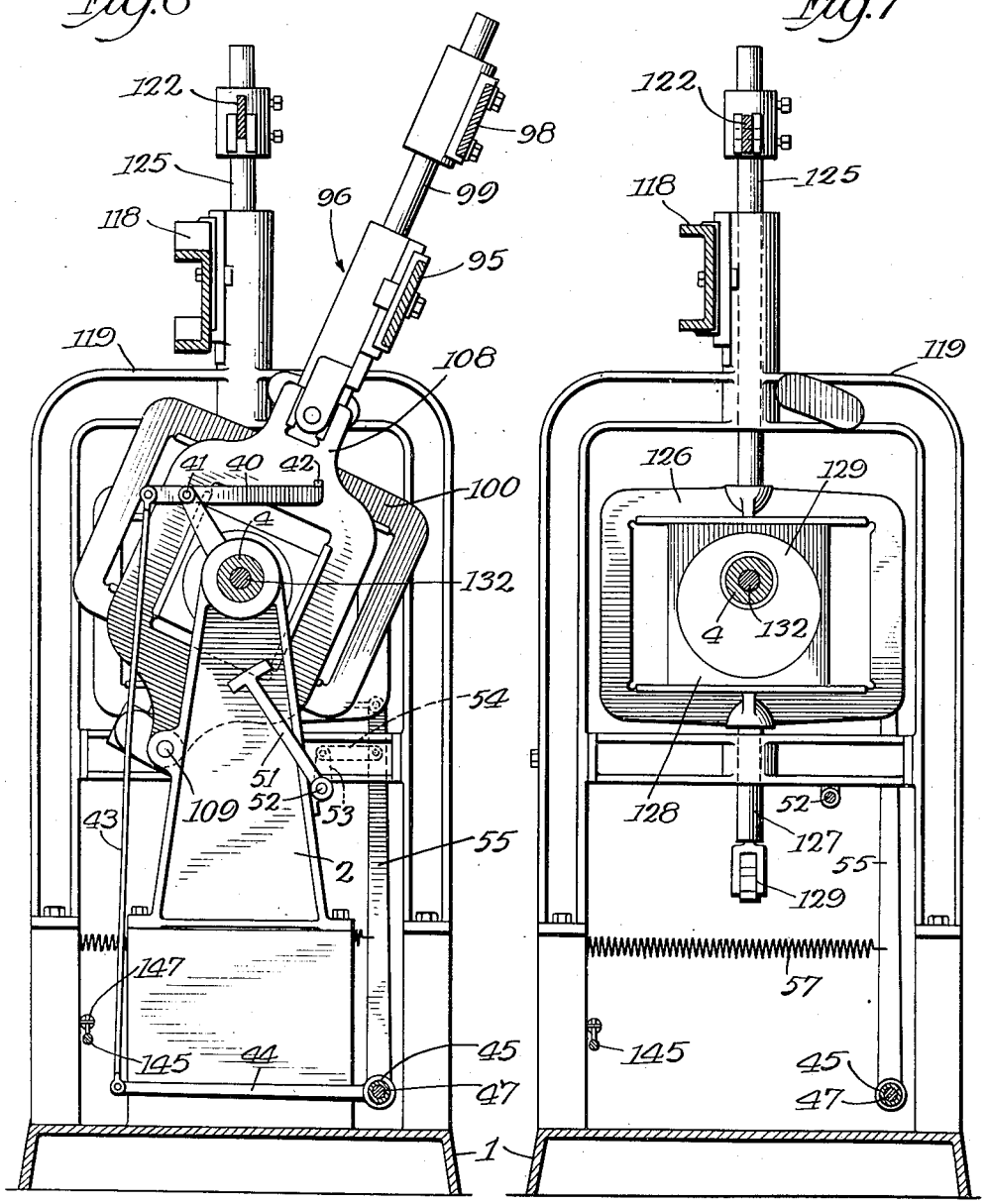

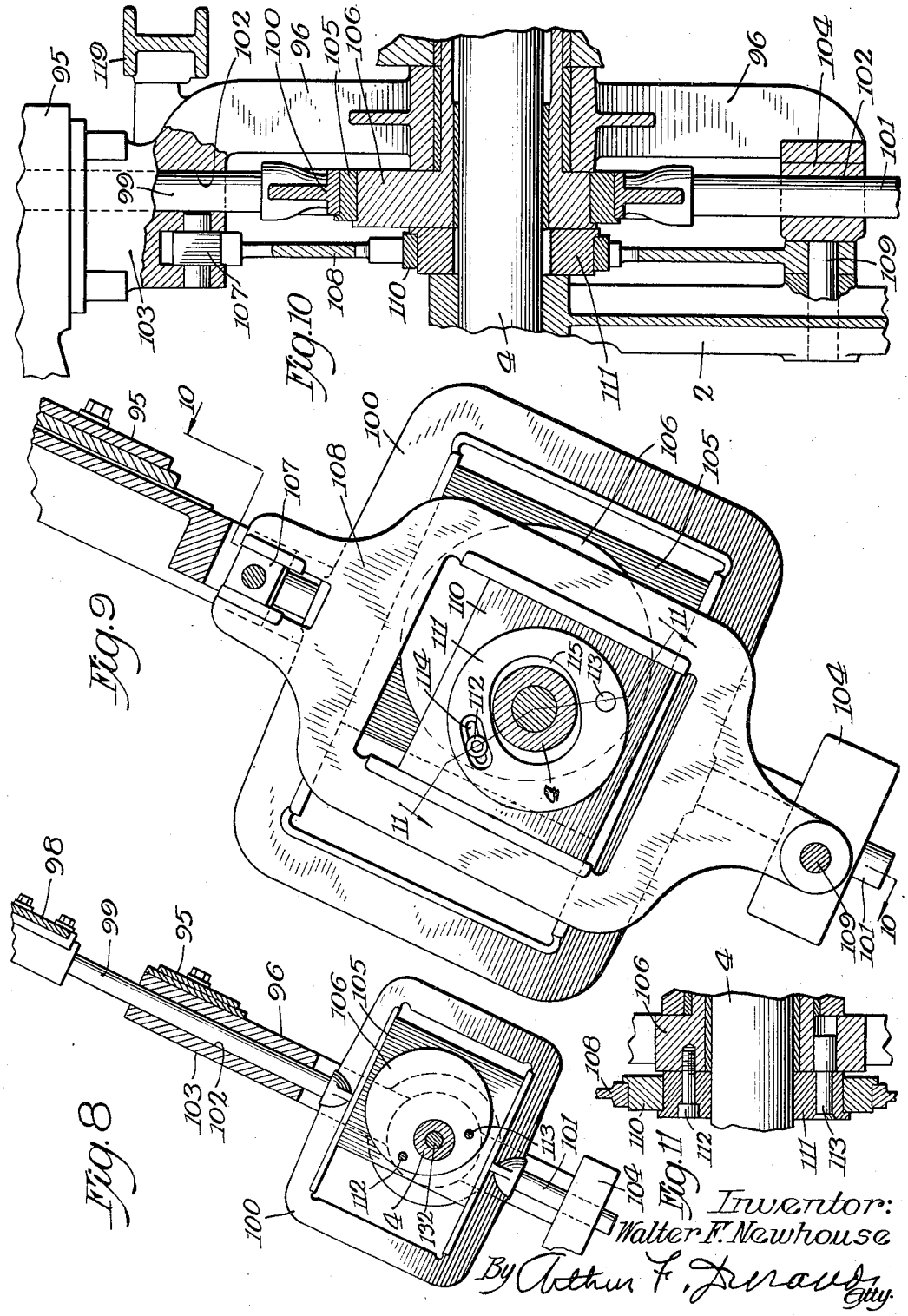

June 23, 1942.    W. F. NEWHOUSE    2,287,121
MACHINERY FOR MAKING CONTAINERS
Original Filed Feb. 4, 1937    12 Sheets-Sheet 7
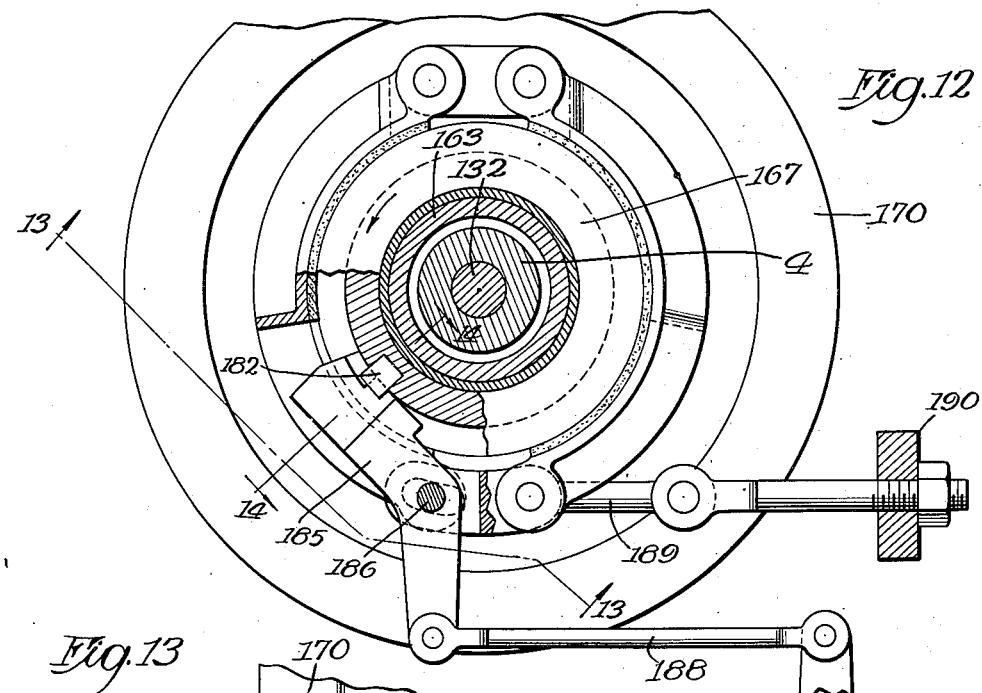
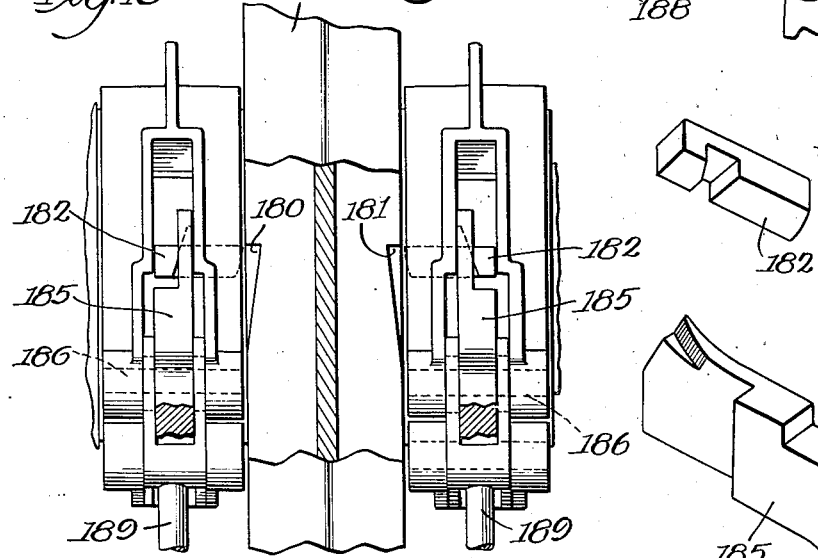
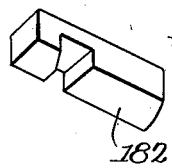
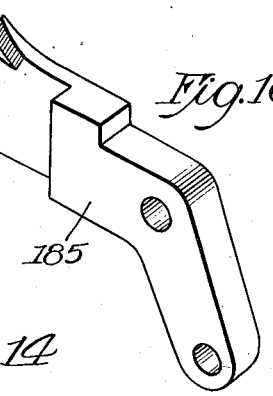
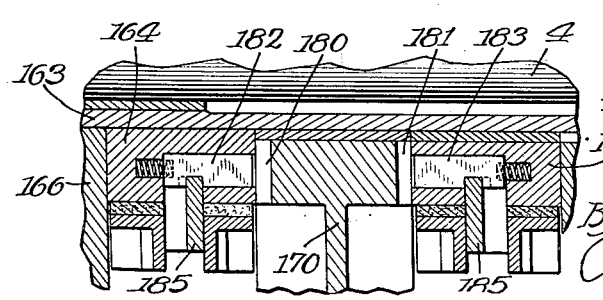
Inventor:
Walter F. Newhouse

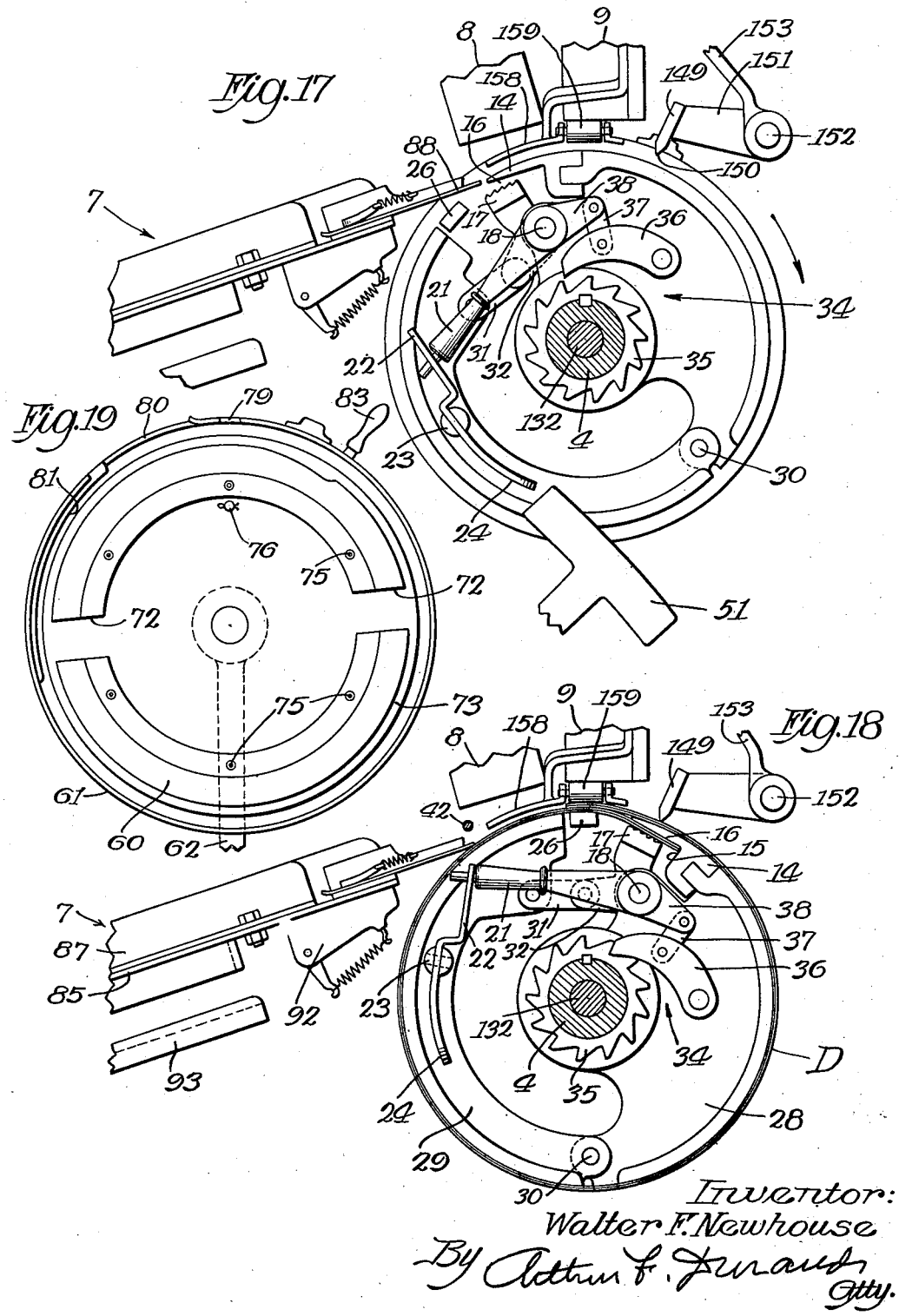

June 23, 1942.  W. F. NEWHOUSE  2,287,121
MACHINERY FOR MAKING CONTAINERS
Original Filed Feb. 4, 1937    12 Sheets-Sheet 9
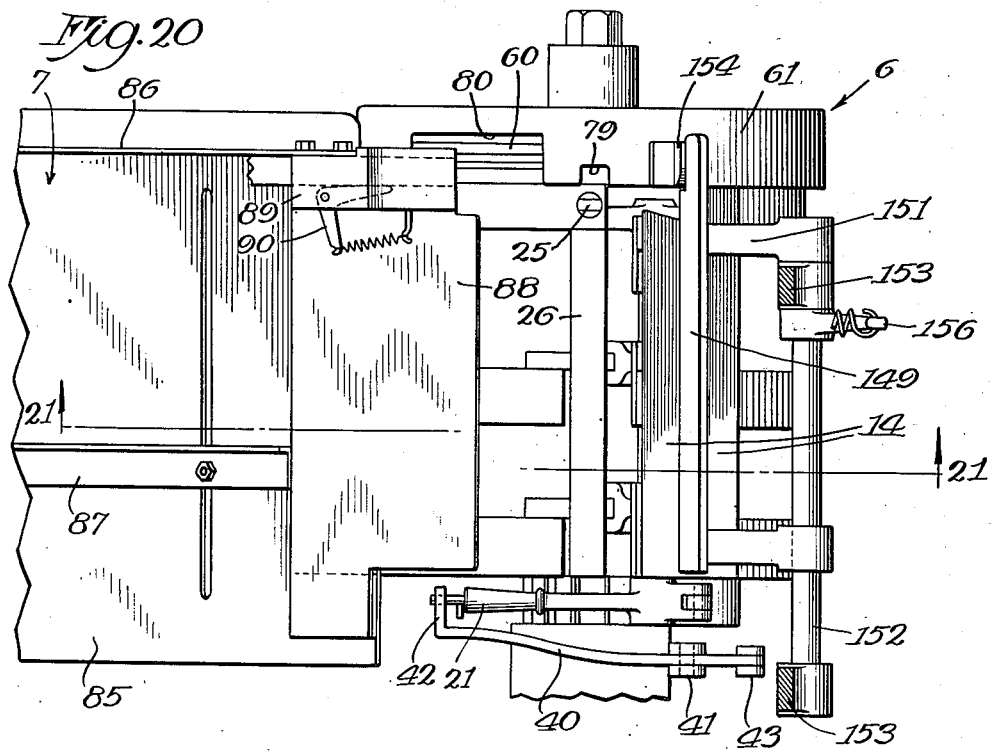
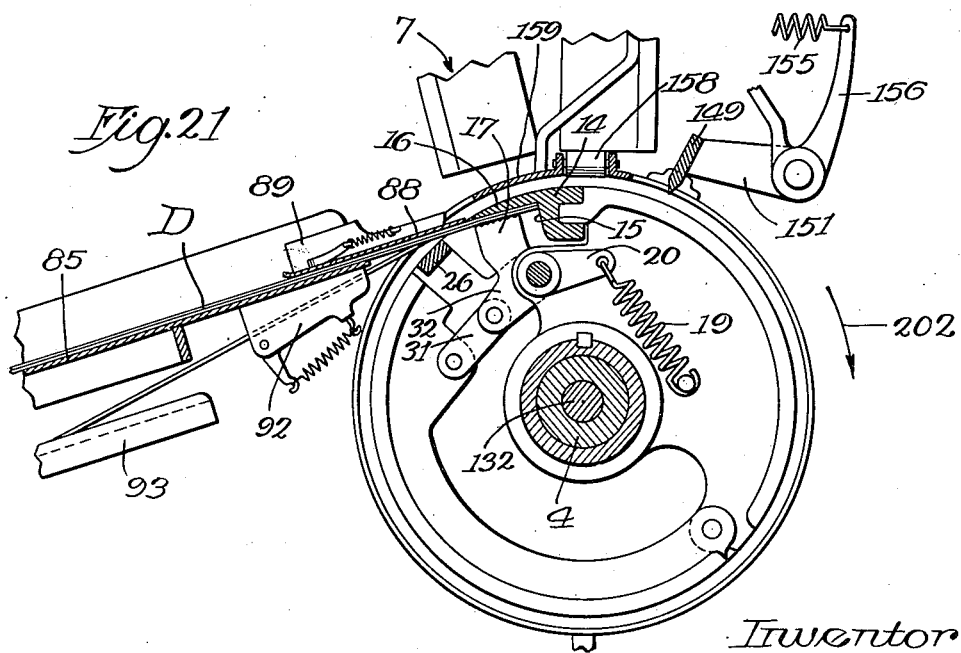
Inventor:
Walter F. Newhouse
By Arthur F. Durand
Atty.

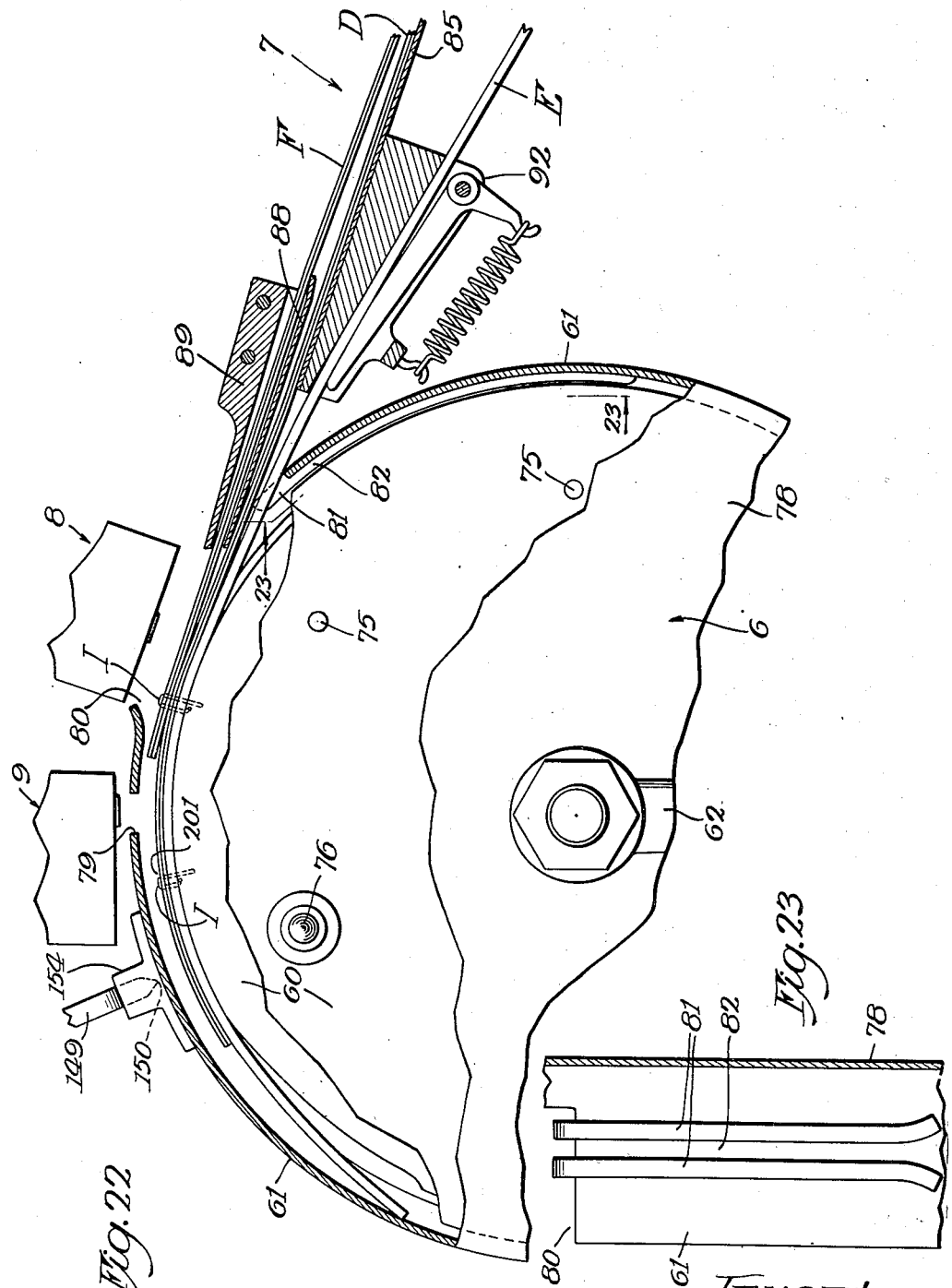

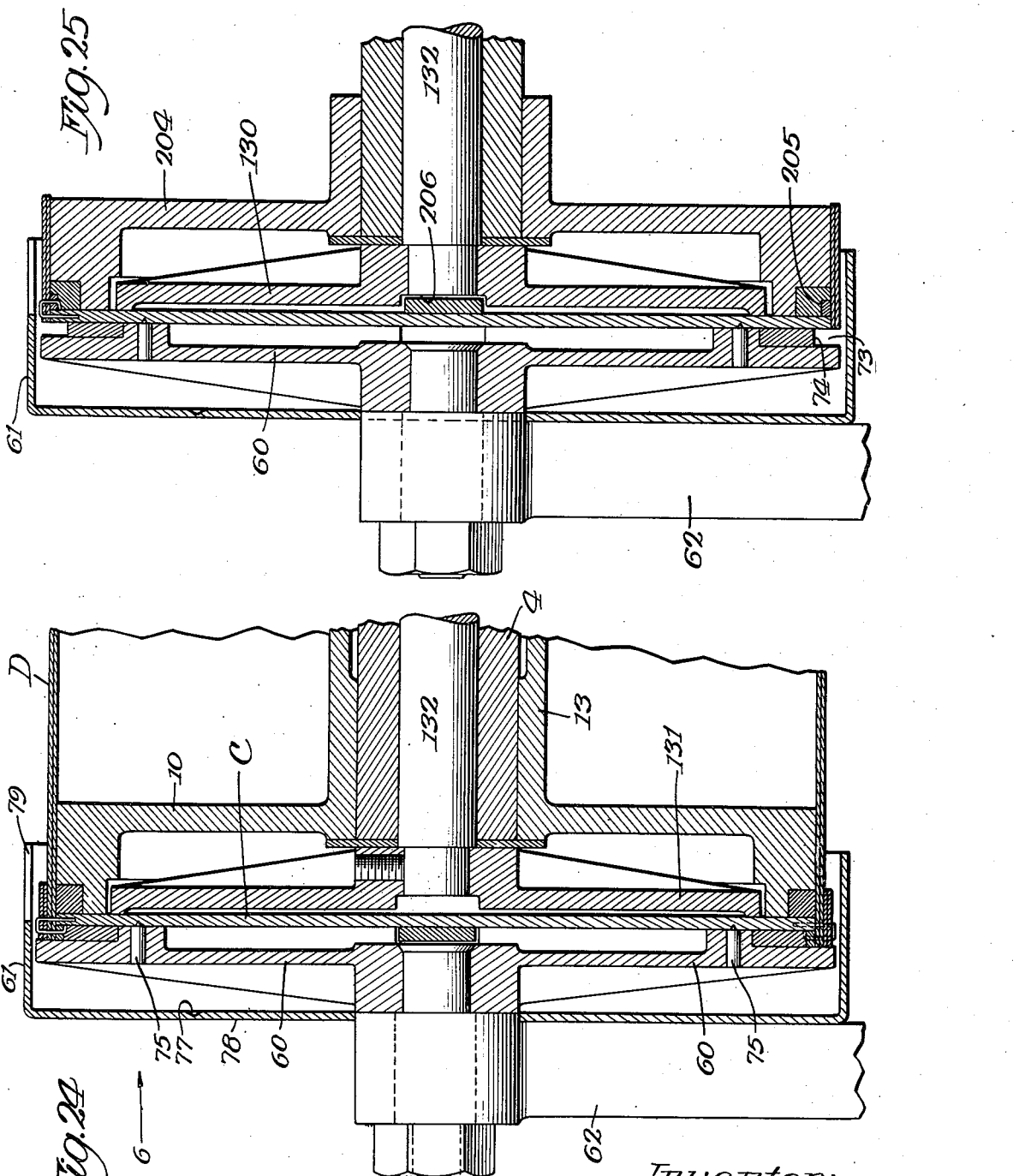

June 23, 1942. W. F. NEWHOUSE 2,287,121
MACHINERY FOR MAKING CONTAINERS
Original Filed Feb. 4, 1937  12 Sheets-Sheet 12

Inventor:
Walter F. Newhouse
By Arthur F. Durand
Atty.

Patented June 23, 1942

2,287,121

UNITED STATES PATENT OFFICE 2,287,121

MACHINERY FOR MAKING CONTAINERS

Walter F. Newhouse, Benton Harbor, Mich.

Continuation of application Serial No. 123,960, February 4, 1937. This application September 16, 1939, Serial No. 295,172

15 Claims. (Cl. 147—47)

This invention relates to machinery for making containers, and more particularly to those for making cylindrical containers of the so-called cheese-box type, which latter is commonly made of veneer bent to form a cylindrical side wall, with a fixed head or bottom at the lower end of the cylinder, and a removable cover for the top thereof.

Generally stated, the object of the invention is to provide a novel and improved construction and arrangement, in a stapling machine, whereby a cheese-box or other container of a similar nature may be made or fabricated entirely on a single machine.

It is also an object to provide certain details and features of construction and combinations tending to increase the general efficiency and the desirability of a cheese-box machine, or machine for making similar containers, of this particular character.

To the foregoing and other useful ends, the invention consists in matters hereinafter set forth and claimed and shown in the accompanying drawings, in which—

Fig. 1 is a side elevation of a cheese-box machine involving the principles of the invention.

Fig. 2 is a front elevation of said machine.

Fig. 3 is a fragmentary detail view of a portion of said machine.

Fig. 4 is a view similar to Fig. 1, showing the parts of the machine in different positions.

Fig. 5 is an enlarged longitudinal or axial section of the machine, with certain portions shown broken away for convenience of illustration.

Fig. 6 is a vertical transverse section on line 6—6 in Fig. 1 of the drawings.

Fig. 7 is a similar view on line 7—7 in Fig. 1 of the drawings.

Figs. 8, 9 and 10 are detail sections on a larger scale, and Fig. 11 is a detail section on line 11—11 in Fig. 9 of the drawings.

Figs. 12 and 13 are fragmentary detail sectional views of certain portions of the machine, and Fig. 14 is a detail section on line 14—14 in Fig. 12 of the drawings.

Figs. 15 and 16 are detail perspective views of certain elements of the machine.

Fig. 17 is a vertical transverse fragmentary section on line 17—17 in Fig. 5 of the drawings.

Fig. 18 is a view similar to Fig. 17, showing some of the parts in different positions.

Fig. 19 is a detail side elevation of a portion of the machine.

Fig. 20 is a fragmentary plan view, with certain portions in horizontal section, of certain portions of the machine.

Fig. 21 is a vertical section on line 21—21 in Fig. 20 of the drawings.

Fig. 22 is an enlarged sectional view, more or less diagrammatic in character, illustrating the method of forming and stapling the materials.

Fig. 23 is a fragmentary detail sectional view of a portion of the structure shown in Fig. 22 of the drawings.

Fig. 24 is a detail sectional view of the elements for forming the materials into box form, illustrating the method of incorporating the fixed head or bottom in the lower end of the box.

Fig. 25 is a similar view of the same parts of the machine, but showing the same in operation for the making of the cover of the box.

The product made by this machine consists of a cheese-box A and a cover B therefor, as shown in Figs. 26–30. The box A comprises a circular bottom C, a cylindrical wall D extending upwardly from the bottom C, an inner hoop E, and an outer hoop F. Secured to the under side of bottom C, is a batten G, the ends of which latter are spaced inwardly from the edge of bottom C, to provide room for the inner hoop between the wall D and the batten ends. The cylindrical wall D is made from a rectangular sheet of wood wound around the bottom C and having overlapping end portions which are secured together by a row of staples H. The hoop E, positioned against the inner surface of wall D and flush with the bottom edge thereof, engages the edge portion of the lower side of bottom C and forms a support therefor. The outer hoop F is wound around the lower edge of the wall D and is wide enough to overlie both the inner hoop E and the edge of bottom C.

Figure 30:
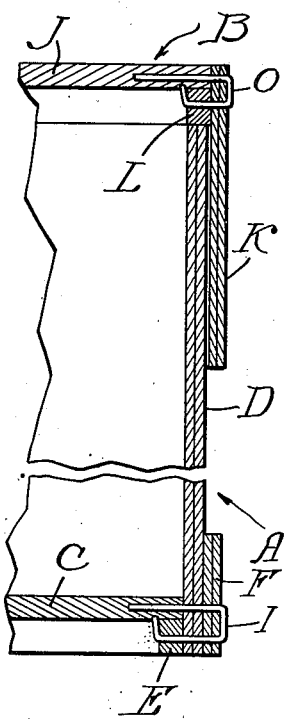
Fig. 30 is a fragmentary section of portions of the complete box, including the cover thereof, showing the latter in position to close the top of the box.
Figure 29:
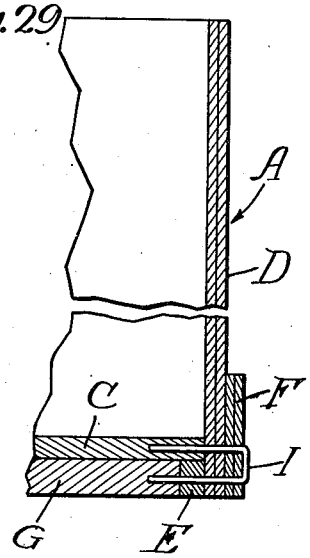
Fig. 29 is an enlarged detail section of a portion of the said cylindrical box or container.

A row of staples I is driven into the lower portion of the box A, securing the hoops and the bottom to the wall D. The upper leg of each staple I passes through the outer hoop F, the wall D, and into the bottom C, and the lower leg passes through the outer hoop F, through the wall D, through the inner hoop E, and is bent over as shown in Fig. 30. The lower legs of staples I, opposite the batten ends, pass through the hoop F, through the wall D, through the hoop E, and into the batten as shown in Fig. 29.

Figure 26:
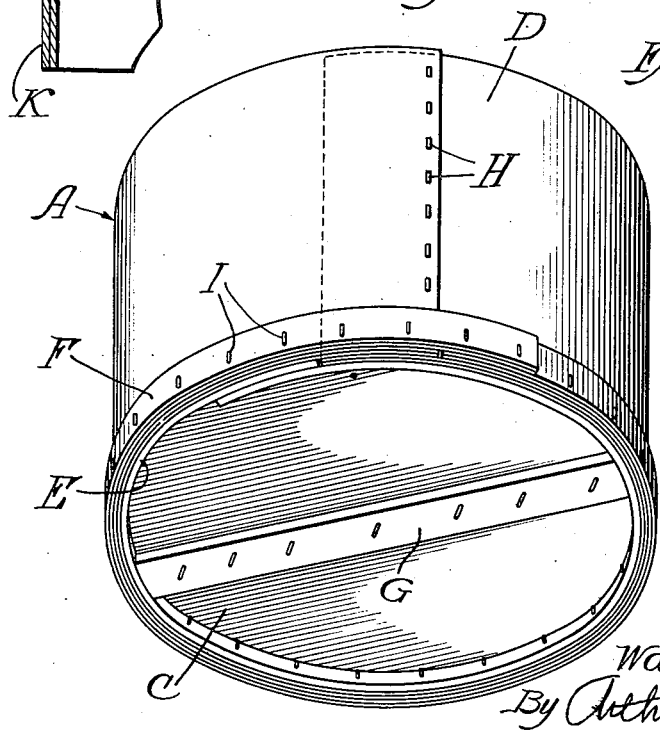
Fig. 26 is a perspective of the cheese-box viewed from the bottom, with the top cover removed.

The hoop F, the wall D, and the hoop E, each have overlapping ends which are arranged in offset or echelon relation with respect to each other so that the outer overlapping end of hoop E abuts the inner end of wall D, and the outer overlapping end of wall D abuts the inner end of hoop F, as shown in Fig. 26.

The cover B, adapted to fit over and close the cheese-box as shown in Fig. 30, comprises a circular top wall J, a sheet wound around and extending downwardly from the top wall J forming a band K, and an inner hoop L, as shown.

Figure 27:
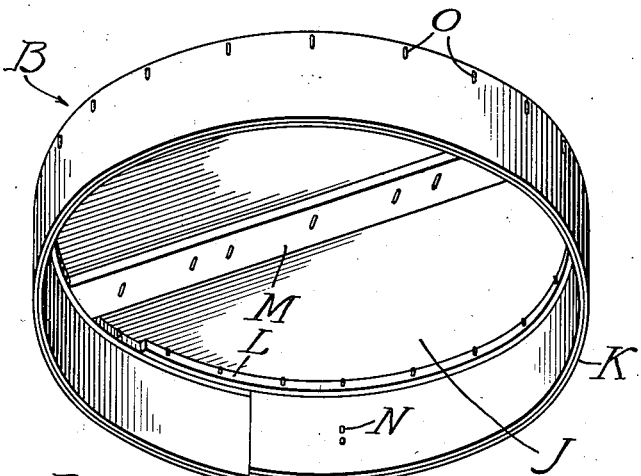
Fig. 27 is a perspective of the said cover, the latter being shown upside down.

Secured to the under side of the top wall J, is a batten M, the ends of which terminate short of the edge of the top J. The hoop L engages the inner surface of band K and the under side of top wall J and forms a support for the latter. The band K has overlapping ends which are secured together by a staple N and which are offset with respect to the overlapping ends of hoop L, as shown in Fig. 27.

Figure 28:
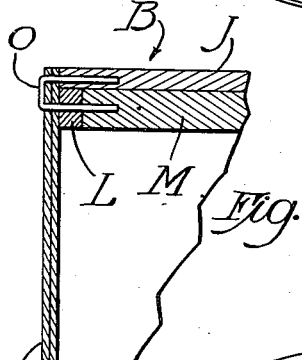
Fig. 28 is an enlarged detail section of a portion of said cover.

A row of staples O is driven into the cover to hold together the top wall J, the hoop L, and the band K. The upper legs of staples O pass through the band K and into the top wall J, while the lower legs of the staples pass through the band K, through the hoop L, and are bent over as shown in Fig. 30. In the staples opposite the batten ends, the lower legs of staples O pass through band K, through hoop L, and into the batten M, as shown in Fig. 28.

The machine shown in Figs. 1 to 25 comprises a base 1, upstanding frame members 2 and 3 supporting a hollow rotatable shaft 4, a form 5 mounted on the forward projecting end of the shaft, a movable gate 6 for holding the bottom in place against the end of form 5, a table 7 for supporting and guiding the wall sheet D, and the hoops E and F, onto the form, an oscillating stapler 8 for stapling or fastening the wall D to the bottom C, a stationary stapler 9 for stapling or fastening together the overlapping ends of wall D, and instrumentalities for operating the parts mentioned.

The form 5 comprises a plurality of substantially complete rings or disc members 10, 11 and 12, spaced apart on and secured to a sleeve 13 which is loosely mounted on the shaft, the three rings forming a substantially cylindrical form or mandrel about which the wall sheet D is wound. A bar 14, having a laterally projecting thin portion and a radial portion forming an abutment 15, is secured to the disc members 10, 11 and 12, and forms the stationary member of a gripper 16. Gripping fingers 17 for clamping the end of wall sheet D against the bar 14, are mounted on a rock shaft 18. The rock shaft 18 is carried by the disc members 10, 11 and 12, and is normally urged by a spring 19 in a direction to close the gripper, one end of the spring being fixed to the disc 11 and the other end being connected to an arm 20 which is fixed to the shaft 18, as shown in Figs. 5 and 21. The lever 21, secured to one end of the rock shaft 18, is adapted to be moved downwardly to open the gripper jaw, and a spring pressed pawl 22, pivoted at 23 on the disc 12, and having a tail 24, is adapted to engage the reduced end of the lever 21 and hold same in lower position. (See Figs. 17 and 18.) The hardened clincher block 25, against which the staples H, driven by the stapler 9, are clinched, is mounted in the disc 10. A bar 26 is fastened to the disc 10 flush with the periphery thereof and extending rearwardly in alignment with the clinch block 25 to provide a smooth supporting surface on the clinch block for the wall D of box.

Each of the disc members or rings 11 and 12 is made in two pieces or segments 28 and 29, the former being fixed on the sleeve 13, and one end of the latter being pivoted at 30 to the segment 28. The outer end of segment 29 is connected to a link 31, which is connected to an arm 32, which is fixed to shaft 18 and forms an extension of the gripper finger 17, as shown in Figs. 21, 17 and 18. The links 31 and arms 32 form a toggle which operates, when the shaft 18 is turned in one direction, to move the segment 29 inwardly about the pivot 30 to, in effect, reduce the circumference of discs 11 and 12 and thus facilitate the removal of the box A therefrom.

The form 5 is loosely mounted on the shaft 4 and is locked thereto for rotation by a clutch 34, which latter comprises a clutch member in the form of a ratchet 35 keyed to the shaft 4, and a pawl 36 pivotally carried by the disc 12 and engageable with the ratchet 35. One end of a link 37 is connected to the pawl 36, and the other end is pivoted to an extension 38 of the lever 21, so that the pawl 36 is disengaged from the ratchet 35 when the lever 21 is turned to open the gripper 16 and move the segments 29 inwardly. A washer 40, secured to the shaft 4, prevents axial displacement of the form 5 in one direction. and the ratchet 35 prevents displacement in the other direction.

A lever 240, fulcrumed at 41 and having a laterally bent end 42, is provided for the purpose of turning the lever 21, and the rock shaft 18, which turning movement simultaneously disconnects the clutch 36, opens the gripper 16, and collapses the form 5. (See Figs. 1, 6 and 20.) The lever 240 is so positioned that the end 42 is located above the lever 21 when the form 5 comes to rest at the end of one cycle of rotary movement, as shown in Fig. 18. The lever end 42 is adapted to move downwardly and engage the lever 21 and move it downwardly until it engages and is held by the pawl 22. The other end of the lever 240 is connected to one end of a link 43, the other end of which latter is connected to one end of a lever 44, and the other end of lever 44 is fastened to a sleeve 45, which latter at one end thereof has secured thereto a foot pedal 46 by which this sleeve is rocked. The sleeve 45 is telescoped over a shaft 47 and both are journaled in bearing blocks 48, as shown.

A T-shaped lever 51, fixed to a shaft 52, is adapted to be moved into engagement with the tail 24 of pawl 22 to rock the pawl about its pivot and release the lever 21. (See Figs. 1, 6 and 17.) The shaft 52, supported by the frame members 2 and 3, has fixed thereon a lever 53 which is connected through a link 54 to a lever 55. The lower end of lever 55 is fixed to the shaft 47, which latter has secured thereto and is rocked in one direction by a foot pedal 56, and which is moved in the other direction by a spring 57. (See Fig. 1.)

The gate 6, comprising a disc 60 and an annular guide 61, is carried by an arm 62 pivoted at 63 to a bracket 64, which latter is fixed to a raised portion 65 of base 1. The gate is adapted to be moved from the lowered or horizontal position (see Fig. 4) to a raised or vertical position, co-axial with shaft 4 (see Fig. 1), where it cooperates with the form 5 to hold parts of the cheese-box in position while the box is being fabricated. To counterbalance the gate 6, the arm 62 is formed with an enlarged end 66, which latter is provided with a projection 67 adapted to engage a spring-pressed pawl 68 for holding the gate in a raised position. The pawl 68 is formed with a pedal 69 which is depressed to release the gate and permit it to be lowered. When in lowered position, the gate rests on a stop pin 26, as shown in Fig. 4.

The disc 60 is rotatably carried by the arm 62 and is provided with a substantially flat face 71 and a groove 72 extending diametrically across the face of the disc. A bottom board C is adapted to fit against face 71 of disc 60 with the batten G fitting in the groove 72. The disc 60 is further provided with a circumferential notch or rabbet 73 having a shoulder 74, except where intercepted by the groove 72, against which shoulder one end of some of the staples I are deflected or clinched, as shown in Fig. 24. The circumferential rabbet 73 and the edge portion of bottom board C, when in place, form a groove for receiving and positioning the inner hoop E. A plurality of pins 75, having sharp projecting ends, are carried by the disc 60 and are adapted to engage the bottom board C and prevent lateral displacement thereof. In order to position the disc 60 so that the groove 72, and therefore the batten of bottom C, are correctly positioned, the disc is provided with a spring-pressed detent 76 that fits into a shallow recess 77 in the fixed plate 78.

The annular guide member 61 is formed integral with the transverse plate 78 and is rigidly secured, concentric with the disc 60, to the arm 62. The cylindrical wall of guide 61 is spaced from the edge of the disc 60 and is provided with a notch 79 for the stapler 9 and a larger opening 80 to permit the passage therethrough of the hoop strips E and F and the wall D and to permit the operation of stapler 8. A pair of tracks 81, forming a groove 82, is provided adjacent the opening 80 to direct the forward end of the inner hoop E during the formation of the cheesebox. A handle 83 is secured to the plate 78 to facilitate the manual movement of the gate 6.

The table 7 (see Figs. 1, 2, 17, 18, 20 and 21) extends laterally from the form 5 and is supported by rods 84. It is inclined upwardly toward the upper side of the form 5, being substantially tangential thereto. The table comprises a plate 85 upon which is mounted a fixed angle bar 86, accurately aligned relative to form 5, and an adjustable angle bar 87. A short plate 88, carried by the upper end of table, is spaced above and projects beyond the plate 85 and serves to guide the sheet D into the gripper 16 of the form 5, as shown in Fig. 21. A recessed guide member 89 is secured, above the plate 88, to the angle bar 86 and serves to guide the strip for the outer hoop F. A spring-pressed finger 90 is mounted in guide 89 to press the hoop strip against the angle bar 86 to insure its proper alignment. The inner hoop guide 92 is fastened, adjacent the form 5, to the under side of plate 85, and in vertical alignment with the vertical wall of angle bar 86. A channel bar 93, located behind and in alignment with the guide 92, supports the rear portion of the hoop strip E.

The stapler 8 (see Figs. 1, 2 and 22) is positioned above the form 5 in the plane of the bottom C and hoops E and F. It is adapted to oscillate about the shaft 4 and move a short distance with the form 5, while each staple is being inserted, at the same speed of rotation of the form, to drive a row of staples I into the cheese-box while the form 5 is being rotated. In this way, the stapler 8 and form rotate a distance in unison each time a staple is inserted. The stapler is mounted on an overhanging bracket 95 adjustably secured to the upper end of an oscillatable frame 96, which is fulcrumed on the shaft 4. The stapler 8 and the wire feed 97 are connected to and operated by an arm 98 adjustably secured to the upper guide rod 99 of a yoke 100. The yoke 100 has a lower guide rod 101 which, together with the upper guide rod 99, pass through apertures 102 in the offset portions 103 and 104 of frame 96 (see Figs. 1, 5, 6, 8, 9 and 10). Slidably engaging the parallel bars of the yoke 100, is a block 105 apertured to receive an accentric 106 which, when rotated, imparts a reciprocating motion through the block 105 to the yoke 100.

In the offset portion 103 of the frame 96, a block 107 is pivoted, which is engaged by a bifurcated end of a yoke 108. The yoke 108 encloses the shaft 4 and has its lower end pivoted at 109 to the frame 2. A block 110 is slidably mounted in the yoke 108 and is apertured to receive an eccentric 111, which is adjustably secured to the eccentric 106 by bolt 112 and pin 113. The eccentric 111 is provided with an arcuate slot 114 to receive the bolt 112, an arcuate slot 115 to receive the shaft 4, and the pin 113 which projects into an aperture in eccentric 106 and about which the eccentric 111 pivots when adjustments are made. As the eccentric 111 rotates, the yoke 108 is oscillated about its pivot 109 and through the sliding connection with the block 107 it imparts an oscillating movement to the frame 96. Since the eccentrics 106 and 111 are secured and rotate together, the yoke 100 is reciprocated in the frame 96 in timed relation to the oscillations of the frame 96. The parts are so timed that the staple I is driven during the movement inwardly or toward the vertical of the stapler 8.

The stapler 9, for stapling the overlapping ends of the wall D of the box, is mounted on the overhanging end portion of a horizontal frame member 118, adjustably secured to the upper end of the frame members 3 and 119, as shown in Figs. 4 and 5. The stapler 9 and the wire feed 120 are connected by a link 121 to one end of a walking beam 122 fulcrumed at 123 to the frame 118. The other end of walking beam 122 is pivotally connected at 124 to the upper guide rod 125 of a yoke 126. The yoke is provided with a lower guide rod 127 which, together with upper rod 125, are slidably supported by the frame 119. The yoke 126 slidably engages a block 128 apertured to receive an eccentric 129 for imparting a reciprocating movement to the yoke 126.

A plunger 130 is provided for advancing the box intermittently, longitudinally of the form 5, to correctly position the box relative to the stapler 9 during the operation of stapling the overlapping ends of the wall D, and the plunger also removes the box from the form 5. The plunger 130 (see Figs. 4, 5, 24 and 25) is in the form of head or disc 131, normally fitting within a recess in the disc 10, and is secured to one end of a rod 132 which is slidably mounted in the hollow shaft 4. The rear end of the rod 132 projects beyond the shaft 4 and is provided with annular ratchet teeth 133, which are normally engaged by a spring-pressed pawl 134, having a releasing arm 135. The pawl 134 is pivotally carried by one end of a bell crank lever 136 fulcrumed at 137 on the frame 3. The other end of the bell crank lever 136 is connected at 138 to the lower guide rod 127 of the yoke 126 so that, as the yoke reciprocates, the bell crank lever oscillates to feed the plunger forwardly.

By the up-stroke of the yoke 126, the stapler 9 is operated through walking beam 22 to drive a staple H into the wall D of the box; and the bell crank lever 136 is rocked to move pawl 134 behind the next ratchet tooth 133 on the rod 132. By the down-stroke of the yoke 126, the mechanism of stapler 9 is returned and the bell crank 136 is oscillated to advance the plunger 130 the length of one ratchet tooth 133.

In order to permit the manual return of the plunger 130, an arm 140 is adapted to be moved against the arm 135 to disengage the pawl 134 from the ratchet teeth 133. (See Fig. 4.) The arm 140 is fixed to one end of the rock shaft 141, which is mounted on the side of the frame 3. A lever 142, fixed to the other end of the rock shaft 141, is connected through a link 143, a bell crank 144, a link 145, to a foot pedal 146. The depression of the foot pedal 146 is adapted to rock the arm 140 in one direction, and a spring 147 is provided to restore it.

A guide member 149 (see Figs. 2, 17, 18, 20, 21 and 22) in the form of a bar having a sharp lower edge 150, is fixed to one end of a pair of arms 151, which are fastened to a rock shaft 152. The shaft 152 is mounted in brackets 153, which are fastened to the frame 118. The guide 149 is moved up to, and maintained, in a raised position, spaced from the form 5, by a wedge or cam 154 carried by the guide member 61 of the gate 6. A spring 155, connected at one end to the frame 118, and at the other to a lever 156, fastened to the shaft 152, urges the guide member 149 downwardly. As the gate 6 is moved down away from the form 5, the guide member 149 is moved into engagement with the wall D of the box and acts to prevent the unwinding or lateral movement of one end of the wall sheet D, while permitting the longitudinal movement thereof. (See Fig. 18.)

A row of rollers 158 is carried by a curved plate 159 which is secured to the frame 118. The rollers are positioned in longitudinal alignment with the stapler 9 and directly over the overlapping ends of the wall sheet D, when the wall sheet D comes to rest after being wound on the form 5. The rollers 159 aid in preventing the separation of the overlapping ends of the wall sheet D while the box is being intermittently advanced under the stapler 9.

The sleeve 163 (see Fig. 5), formed as an integral extension of the eccentric 106, is loosely mounted on the shaft 4 and has keyed thereon a clutch block 164 of a clutch 165 and a spider arm 166. The sleeve 163 has loosely mounted thereon, and forms a support for, the oscillating frame 96, the eccentric 129, a clutch block 167 of a clutch 168, and a pulley 170 positioned between the clutch blocks 164 and 167. The clutch block 167 is keyed to the eccentric 129 at 169, as shown. The sleeve 163 drives the shaft 4, in timed relation, through planetary reduction gearing 172. A gear 173, keyed to the shaft 4, meshes with a gear 174 of a gear cluster which rotates about a shaft 175 and is carried by the spider 166. The other gear 176 of cluster 176 is larger than the gear 174 and meshes with a preliminary gear 177 secured to the frame 3 by bolts 178. In the construction shown, the spider 166 carries two gear clusters diametrically opposite each other. When the spider 166 is rotated about the shaft 4, the gear clusters are carried therewith around the stationary gear 177, which causes each gear cluster to rotate about its axis, which imparts a rotary movement to the gear 173 and the shaft 4.

The pulley 170 is driven by a belt (not shown) from a suitable source of power and has a large hub provided, on opposite faces thereof, with recesses 180 and 181. (See Figs. 5, 12, 13 and 14.) The pulley hub and recesses therein form the driving member of the clutches 165 and 168. Spring-pressed clutch pins 182 and 183 are slidably mounted in the clutch blocks 164 and 167, respectively, and are urged toward the hub of the pulley 170 and into the recesses. The clutch pins are held out of engagement with the recesses in the hub of the pulley by pin-retracting members 184 and 185, which are pivoted on pins 186 and connected to links 187 and 188, respectively. The pins 186 are carried by supporting members 189 fixed to the frame 190. Brake bands 191, connected to supporting members 189, are provided for each clutch 168 and 165. The link 187 is connected to the lever 57 previously described, which is moved by the foot pedal 56, and the link 188 is connected to a lever 192, which is fixed to the sleeve 45, previously described, and which is moved in one direction by the foot pedal 46 and returned by a spring 193. When the member 185 is moved away from the clutch pin 182, the pin is moved into engagement with the recess 180 in the hub of the pulley 170 and effects a driving connection between the pulley and the clutch block 167. When the member 185 is returned to its normal position, as shown in Fig. 12, the clutch pin is retracted and the clutch 168 is disengaged. The operation of clutch 165 is the same as that of clutch 168 just described.

Thus, by depressing the foot pedal 46, the clutch 168 is engaged, which rotates the eccentric 129, which reciprocates the yoke 126 to operate the stapler 9 and intermittently advance the plunger 130. The lever 40 is also moved by the depression of the pedal 46. By depressing the foot pedal 56, the clutch 165 is engaged, which rotates the sleeve 163 and eccentrics 106 and 111, which effects the operation of the stapler 8 and the oscillation of the stapler supporting frame 96, the rotation of sleeve 163 also driving the shaft 4, through the planetary gearing 172, and effecting the rotation of the form 5. The T-shaped lever 51 is also moved by the depression of the pedal 56.

The clutch 168 or 165 remains engaged for one or more complete revolutions, depending on the length of time the operator keeps the foot pedal depressed.

To prevent the clutch 168 from being engaged and, through its associated drive, advancing the plunger 130 while the gate 6 is in its vertical position, an interlock between the gate 6 and the clutch operating mechanism is provided. This interlock takes the form of an arm 195, which is fixed to the sleeve 45 and which is adapted to strike against a projection 196 of the counterweight 66 when the gate 6 is up and thus prevent the turning of the sleeve 45 and the engagement of the clutch 168. (See Figs. 1 and 2.)

In the operation of the machine, the gate 6 is brought to an open or horizontal position, with the groove 72 in the disc 60 positioned transversely of the machine. A bottom board C is placed on the disc 60, the batten G fitting into the groove 72. The form 5, now loose on the shaft 4, is manually rotated from the position shown in Fig. 18 to the position shown in Fig. 17, so that the edge of the plate 88 is almost touching the bar 14 on the form 5, and the gate 6 is then manually moved to a vertical position, placing the bottom C against the end of form 5 and concentric therewith.

The hoop strip E is then put in position, the forward end passing through the guide 92, through the opening 80 in the guide 61, into the grove 73 of the disc 60, and beyond and engaging the inner surface of the guide 61. (See Fig. 22.) The hoop strip E is moved forward until its rear end engages the gauge block 198 (see Fig. 2), which correctly positions the hoop strip relative to the bottom C and the oscillatable stapler 8.

The wall sheet D is then placed on the table 7 with its side edge engaging the angle bar 86, and moved forward until its forward end passes into the gripper 16 of the form 5 and strikes the abutment 15, as shown in Fig. 21. A portion of the forward end of the sheet D extends axially beyond the gripper bar 14 and the form 5 and overlies the edge of the bottom C and the inner hoop E, as shown in Figs. 5 and 24.

The operator then steps on the foot pedal 56 long enough for one staple I to be driven at 201 (see Fig. 22), which connects the bottom C and the hoop strip E to the wall sheet D at that point. Simultaneously with the driving of the staple I, the form 5 is rotated one step in the direction indicated by arrow 202, as shown in Fig. 21.

When the foot pedal 56 is initially depressed, at the beginning of a cycle of operation, the lever 51 is moved upwardly, which engages and rocks the pawl 22 to release the lever 21 and permit the shaft 18 to turn, to simultaneously engage the clutch 34, close the gripper jaws 16, and move the segments 29, of the disc members 11 and 12 of the form 5, outwardly. And, simultaneously with the movement of the lever 51, the depression of the foot pedal 56 engages the clutch 165 which effects a partial rotation of the form 5, the operation of the stapler 8, and the oscillation of the stapler supporting frame 96. Thus, after the initial depression of the pedal 56, the form 5 has been locked to the shaft 4, one end of the sheet D has been attached to the form 5 by the gripper 16, the form 5 has been rotated one step and has come to rest, and one staple I has been driven.

The outer hoop strip F is now put in position on the table 7, with the forward end passing through the guide 89. The rear end of the strip F is moved back against the gauge block 203 (see Fig. 2), which movement correctly positions the strip so that the forward end is spaced back from the edge of the sheet D the proper distance.

The foot pedal 56 is again depressed, which effects the operation and oscillation of the stapler 8 and the rotation of the form 5. As the form 5 rotates, the sheet D is wound thereon and stapled to the bottom C, the operator releasing the pedal 56 at the completion of the winding and stapling operation. The box is then in the position shown in Fig. 18, with the overlapping ends of the wall sheet D on the upper side of the form 5 and directly beneath the stapler 9 and with a complete row of staples I driven through the wall D into the bottom C.

The box is now ready to have the overlapping ends of its wall D fastened together by the staples H, and the operator depresses the pedal 69 for releasing the gate 6, and by grasping the handle 83, lowers the gate to the horizontal position. This permits the downward movement of the guide bar 149, whose sharp edge 150 engages the wall D, as shown in Fig. 18. The operator then depresses the foot pedal 46, which moves the lever 40 downwardly, which engages and moves the lever 21, which rocks the shaft 18 and effects the simultaneous disengagement of the clutch 34, the opening of the gripper 16, and the movement inwardly of the segments 29 of the discs 11 and 12 of the form 5. The opening of the gripper 16 releases the end of the wall sheet D so that the box may be moved off of the form 5. Simultaneously with the movement of the lever 40, the depression of the foot pedal 46 engages the clutch 168, which effects alternately the operation of the stapler 9 to drive a staple H, and the movement of the plunger 130 to advance the box A intermittently. The pedal 46 is held down until all of the staples H have been driven and the cheese-box has been moved off of the form 5.

The plunger 130 is restored to its original position by first depressing the pedal 146, which releases the pawl 134 from the ratchet teeth 133 of the plunger rod, and then manually moving the plunger rearwardly.

When making the cover B for the cheese-box A, a form 204 is substituted for the form 5 used in making the cheese-box. (See Figs. 25 and 27.) The form 204 comprises a disc secured to the shaft 4 and provided with a peripheral rabbet 205 to receive the hoop L, and is recessed to receive the plunger 130. In making the cover B, the top wall J is placed against the face of the form 204, with the batten fitting into a groove 206 in the plunger 130. The gate 6 cooperates with the form 204 to hold the top J in place. The inner hoop L and the cover band K are guided onto the form in the same manner as the inner hoop E and the wall sheet D, respectively, of the cheese-box A. The oscillating stapler 8 drives a row of staples O into the cover B as the hoop L and the band K are wound around the top wall J of the form 204. The stapler 9 drives one staple N into the overlapping ends of the band K to secure them together.

From the foregoing, it will be seen that the entire container, shown and described, is made complete on a single machine. The body of the container—in this case, a cylindrical cheese-box —is not removed from the machine until the cylindrical side wall structure, with a fixed bottom, is complete. Thereafter, on the same machine, the telescoping top cover for the box is made in the manner shown and described. If desired, the machine can be run steadily for the production of the cylindrical box bodies, in desired quantities, and thereafter the machine, readjusted as explained, can be run steadily for the making of the covers for said box bodies. In any event, the entire cylindrical container is made on one and the same machine, thus obviating the necessity of using two or more machines for the manufacture of containers of this kind. Since the body of the box and the top cover are similarly constructed, the term "container" as used herein and in the appended claims is to be understood as including both the body of the box as shown in Fig. 26 and the cover therefor as shown in Fig. 27, and the term "bottom" is to be understood as including the end C of the body and the end J of the cover. What is shown in Fig. 26, in other words, is a relatively deep container, while what is shown in Fig. 27 is a relatively shallow container, each of which has a bottom stapled therein and a stapled side seam.

While the specific container shown and described is of the cheese-box type, it will be readily understood that the invention may be used for the production of other containers, for other purposes, without departing from the spirit of the invention. For example, by changing the proportions of certain parts of the machine, a container having a longer cylindrical body, such as some of the well known cylindrical barrels, can be made, if desired.

The materials of the box or container are ordinarily wood veneer, or wood sheets or strips of suitable character, but any flexible materials can be used that will accommodate themselves satisfactorily to the various operations of the machine.

Of course, the battens G and M are not stapled in place on the said machine, as this is done elsewhere. However, it is true that the stapling of the bottom head in place, and the stapling of the side seam, are both done on one and the same machine.

Thus it will be seen that the round container shown and described is made by first rotating it about its axis, continuously, in order to staple the batten G and bottom C in place, and also to staple the hoop F in place, if a hoop is desired, and that the machine is then operative to drive the staples H to fasten the side seam of the container. This stitching of the side seam, it will be seen, is done after the fastening of the bottom of the container in place, and in such a manner that the stitching starts at the bottom end of the container and progresses toward the top or open end of the container. The feeding movement of the container, axially, is preferably intermittent, so that the stapler for stitching the side seam may be stationary. And, as shown and described, means in the form of an attachment are provided, which are interchangeable with parts of the machine, for the making of a cover for the container, so that the entire container, both the body thereof and the cover therefor, are made on one and the same machine.

Looking at Fig. 2 of the drawings, it will be seen that the staplers 8 and 9 converge to the axis of rotation of the container, when viewed in the direction of said axis, and hence that the machine has a plurality of staplers each arranged radially of said axis, so that all of the staples driven in the container are exactly radial to said axis thereof.

It will be seen, therefore, that an important feature of the invention is the provision of a plurality of staplers disposed in planes that converge to and intersect the axis of the rotary form on which the container is made, whereby each and every staple is radial to said axis, with at least some of said staples thus each inserted radially of said axis being arranged in a circular or endless row encircling the container. In addition, another important feature is the movement of the container axially and relatively to a stapler for the purpose of stapling a side seam, which may involve the insertion of only a single staple, as in making the head or cover section of a container, or which may involve the insertion of a plurality of staples as is necessary for stapling the side seam of the body section of a container.

As shown in Fig. 2 of the drawings, the staplers 8 and 9 are in a plane that is transverse to the axis of the container, and the stapler 8 is maintained in an inclined position, as shown, so that the overhanging side of this inclined stapler is toward the materials that are in rotation on the rotary form. By inclining the stapler 8 in the manner shown, clearance is provided to prevent interference with other parts of the machine, and in addition, each staple driven by this stapler is on an inclined line that intersects the axis of the rotary form, this stapler being maintained at the right hand side of the vertical plane of said axis.

This is a continuation of Newhouse application Serial No. 123,960, filed February 4, 1937, for Machinery for making containers.

By the term "container" is meant either the container body or the container cover, and in each case it is obvious that one transverse side of the cylindrical container is closed before the side seam of either the body or the cover is stapled together. In the body of the container it is the bottom wall that is put in first, before the side seam is stapled, whereas in the cover it is the top wall which is put in first before the relatively shorter side seam is stapled.

What I claim as my invention is:

1. A machine for making a round container having a bottom and side wall, comprising, in combination, a hollow shaft, a rotary power driven member for rotating said shaft, a container form loosely mounted on said shaft, means for holding a container on said form as it is being made, a first stapling mechanism arranged to drive stapler into the side wall and bottom of the container during rotation of the form, means coupling said form to said shaft to cause said rotation, means operated by said shaft for operating said first stapling mechanism, said form having a section, means mounting said section for movement axially relative to the main portion of the form to engage the stapled bottom of a container and move the container axially of the form and finally strip the same therefrom, a rod extending through said hollow shaft and secured to said movable section of the form to thereby move said section, a second stapling mechanism arranged to drive staples into the side wall of the container during axial movement of the form, means operated by said rotary power member for actuating said second stapling mechanism, and means for simultaneously moving said rod axially of said shaft.

2. A machine for making a container having a bottom and side wall, comprising, in combination, a rotating form for forming the container and supporting the container while it is being made, means for rotating said form, said form having a section movable axially of the main portion of the form for moving the container axially of the form and stripping the same therefrom, means for intermittently actuating said section, a first stapling mechanism for driving staples into the side wall and bottom of the container supported on the form, means for moving the first stapler bodily in unison with the rotating form and container thereon and means for actuating the staple driving means of the stapler during said movement of the stapler, means for returning said first stapling mechanism to normal position, a second stapling mechanism for driving staples into the side wall of the container as the latter is moved axially of the form, and means operating said second stapling mechanism between the intermittent movements of said section, so that the clutch and gripper are coordinated in their respective functions.

3. A machine of the kind described, comprising, in combination, a rotary shaft, a rotary form secured to said shaft, a stripper arranged adjacent the end of the form, means for intermittently moving said stripper away from the end of the form, a first stapler, means for operating the same during rotary movement of said form, a second stapler, means for operating the same during movement of said stripper away from said form, a rotary power member means to connect said member to said shaft and to said means for operating said first stapler, and means to connect said member to the means for operating said second stapler and to the means for moving said stripper.

4. A structure as specified in claim 3, said means for actuating the stripper including a rotary and endwise moveable rod extending longitudinally in said shaft, and rotating in unison with said shaft which latter is tubular for that purpose, and means to actuate said rod endwise.

5. A structure as specified in claim 3, the said second stapler being disposed in an inclined position at one side of the vertical plane of said shaft.

6. A machine for making a round container having a bottom and side wall with a longitudinal side seam, comprising a rotatable form for supporting the parts of the container while it is being made, means for rotating said form, a first stapling mechanism for driving staples into the side wall and bottom of the container during rotation of the form, said form including arcuate anvil means cooperating with said stapling mechanism for setting said staples, means operable in timed relation with said form rotating means to cause said stapling mechanism to successively drive staples during rotation of said form, means operable after said first stapler has finished its stapling operation to hold said form substantially stationary, a stripper movable axially with respect to said form for stripping the container from the form while the form is maintained substantially stationary, a second stapling mechanism cooperating with said anvil means for stapling said longitudinal side seam, and means for operating said second stapling mechanism and said stripper for stapling said longitudinal seam during a stripping operation.

7. A machine for making a round container having a bottom and side wall with a longitudinal side seam, comprising, a rotary shaft, a rotary power member for rotating the shaft, a rotatable form mounted on said shaft for supporting the container while it is being made, a first stapling mechanism for driving staples into the side wall and bottom of the container during rotation of the form, said form including arcuate anvil means cooperating with said stapling mechanism for setting said staples, means selectively operated by rotation of said rotary shaft for operating said first stapling mechanism to successively drive staples during rotation of said form, means operable after said first stapler has finished its stapling operation to hold said form substantially stationary, a stripper movable axially with respect to said form for stripping the container from the form while the form is maintained substantially stationary, a second stapling mechanism cooperating with said anvil means for stapling said longitudinal side seam, means for operating said stripper, means cooperable with said shaft and said second stapling mechanism and coordinated with said stripper operating means for operating the stapling mechanism by said shaft for stapling said longitudinal seam during a stripping operation, a gripper pivotally mounted on said form and arranged to grip and hold a sheet for forming the container, a clutch for locking said form to said shaft to effect rotation of the form, a handle for opening said gripper, and means connecting said handle to said clutch for simultaneously disengaging said clutch, to thereby permit stripping of the container and operation of said second stapling mechanism by said rotary shaft during stripping of the container from the form.

8. A machine for making a round container having a bottom and side wall with a longitudinal side seam, comprising, a rotary shaft, a rotary power member for rotating the shaft, a rotatable form mounted on said shaft for supporting the container while it is being made, a first stapling mechanism for driving staples into the side wall and bottom of the container during rotation of the form, said form including arcuate anvil means cooperating with said stapling mechanism for setting said staples, means selectively operated by rotation of said rotary shaft for operating said first stapling mechanism to successively drive staples during rotation of said form, means operable after said first stapler has finished its stapling operation to hold said form substantially stationary, a stripper movable axially with respect to said form for stripping the container from the form while the form is maintained substantially stationary, a second stapling mechanism cooperating with said anvil means for stapling said longitudinal side seam, means for operating said stripper, means cooperable with said shaft and said second stapling mechanism and coordinated with said stripper operating means for operating the stapling mechanism by said shaft for stapling said longitudinal seam during a stripping operation, a gripper pivotally mounted on said form and arranged to grip and hold a sheet for forming the container, a clutch for locking said form to said shaft to effect rotation of the form, a handle for opening said gripper, means connecting said handle to said clutch for simultaneously disengaging said clutch, to thereby permit stripping of the container and operation of said second stapling mechanism by said rotary shaft during stripping of the container from the form, and a spring for closing said gripper and engaging said clutch to lock said form to said shaft upon a succeeding operation.

9. A machine for making a round container having a bottom and side wall with a longitudinal side seam, comprising a rotatable form for supporting the parts of the container while it is being made, means for rotating said form, a first stapling mechanism for driving staples into the side wall and bottom of the container during rotation of the form, said form including arcuate anvil means cooperating with said stapling mechanism for setting said staples, means operable in timed relation with said form rotating means to cause said stapling mechanism to successively drive staples during rotation of said form, means operable after said first stapler has finished its stapling operation to hold said form substantially stationary, a stripper having an element pressable against the inside surface of said bottom wall for moving the entire container axially with respect to said form for stripping the container from the form while the form is maintained substantially stationary, a second stapling mechanism cooperating with said anvil means for stapling said longitudinal side seam, and means for operating said second stapling mechanism and said stripper for stapling said longitudinal seam during a stripping operation.

10. In a machine for making a cylindrical container having a side wall and a flat head or end wall, means including a stapler for fastening the end wall in place, means including another stapler for fastening a longitudinal side seam together, means including an element pressing against the inside surface of said head or end wall to move the entire container axially, thereby to change the axial position of the side seam for a stapling operation thereon, said element having a rotary rod with annular rack teeth thereon, and a pawl for engaging said teeth and actuating said rod endwise to exert pressure against said end wall after the latter is stapled to the side wall, a rotary support on which the container slides axially to change the position of the side seam, and means holding said support against axial displacement from its normal position.

11. In a machine for making a cylindrical container having a side wall and a flat head or end wall, means including a stapler for fastening a longitudinal side seam together, an element for pressing against the inside surface of said head or end wall to move the entire container axially, thereby to change the axial position of the side seam for a stapling operation thereon, said element having a rotary rod with annular rack teeth thereon, a pawl for engaging said teeth and actuating said rod endwise to exert pressure against said end wall after the latter is attached to the side wall, means for actuating said pawl a predetermined number of times depending upon the number of staples to be driven in the side seam, a rotary support on which the container slides axially to change the position of the side seam, and means holding said support against axial displacement from its normal position.

12. A machine for making a round container having a bottom and side wall with a longitudinal side seam, comprising a rotatable form for supporting the parts of the container while it is being made, means for rotating said form, a first stapling mechanism for driving staples into the side wall and bottom of the container during rotation of the form, said form including arcuate anvil means cooperating with said stapling mechanism for setting said staples, means operable in timed relation with said form rotating means to cause said stapling mechanism to successively drive staples during rotation of said form, means operable after said first stapler has finished its stapling operation to hold said form substantially stationary, a stripper movable axially with respect to said form for stripping the container from the form while the form is maintained substantially stationary, a second stapling mechanism cooperating with said anvil means for stapling said longitudinal side seam, means for operating said second stapling mechanism and said stripper for stapling said longitudinal seam during a stripping operation, both of said stapling mechanisms being arranged adjacent the plane of said bottom, and means for supporting the stapling mechanisms in different planes radial to the axis of said container with said staplers converging towards said axis to drive radial staples in the container around said container and along said side seam.

13. A machine for making a tubular container having a longitudinal side seam comprising rotary forming means for winding and supporting the wound container, said forming means including anvil means for setting staples, means for rotating said forming means to effect a winding operation, means operable after said winding operation to hold said forming means substantially stationary, stripper means for engaging the container to move the latter axially with respect to said forming means while the forming means is maintained substantially stationary, means for operating said stripper means after said winding operation, a stapler cooperating with said anvil means for stapling said longitudinal side seam of the container, and means coordinated with the movement of said stripper means for operating said stapler to insert a predetermined number of staples in said side seam during said stripping operation.

14. A machine for making a tubular container having a longitudinal side seam comprising rotary forming means for winding and supporting the wound container, said forming means including anvil means for setting staples, means for rotating said forming means to effect a winding operation, means operable after said winding operation to hold said forming means substantially stationary, stripper means for engaging the container to move the latter axially with respect to said forming means while the forming means is maintained substantially stationary, means for operating said stripper means after said winding operation, a stapler cooperating with said anvil means for stapling said longitudinal side seam of the container, means coordinated with the movement of said stripper means for operating said stapler to insert a predetermined number of staples in said side seam during said stripping operation, a shaft extending axially of said forming means for rotating the forming means, and said stripper operating means including means also operated by rotation of said shaft to cause said axial movement of said stripper means and the container.

15. A machine for making a tubular container having a longitudinal side seam comprising rotary forming means for winding and supporting the wound container, said forming means including anvil means for setting staples, means for rotating said forming means to effect a winding operation, means operable after said winding operation to hold said forming means substantially stationary, stripper means for engaging the container to move the latter axially with respect to said forming means while the forming means is maintained substantially stationary, means for operating said stripper means after said winding operation, a stapler cooperating with said anvil means for stapling said longitudinal side seam of the container, means coordinated with the movement of said stripper means for operating said stapler to insert a predetermined number of staples in said side seam during said stripping operation, a shaft extending axially of said forming means for rotating the forming means, said stripper operating means and said stapler operating means including means also operated by rotation of said shaft for causing operation of the stapler and axial movement of the stripper means.

WALTER F. NEWHOUSE.